Aug. 9, 1966 R. L. MALCOLM 3,265,226
GRAIN TANK AND DISCHARGE MEANS THEREFOR
Filed Sept. 24, 1964 2 Sheets-Sheet 1

*INVENTOR.*
ROBERT L. MALCOLM
BY John M Nolan
ATTORNEY

Aug. 9, 1966 R. L. MALCOLM 3,265,226
GRAIN TANK AND DISCHARGE MEANS THEREFOR
Filed Sept. 24, 1964 2 Sheets-Sheet 2

INVENTOR.
ROBERT L. MALCOLM
BY John M Nolan
ATTORNEY

United States Patent Office 3,265,226
Patented August 9, 1966

3,265,226
GRAIN TANK AND DISCHARGE MEANS
THEREFOR
Robert L. Malcolm, Altona, Ill., assignor to Deere & Company, Moline, Ill., a corporation of Delaware
Filed Sept. 24, 1964, Ser. No. 398,851
7 Claims. (Cl. 214—17)

This invention relates to material handling means and more particularly to a material handling apparatus in the form of a grain tank and unloading means for use on agricultural combines or the like.

In a typical combine, a harvesting platform which is carried by the combine ahead of the main body, cuts the grain and feeds it to the body for threshing. The threshed grain is then elevated for discharge into a grain tank which is generally located above the main body. At appropriate intervals the grain tank is emptied into adjacent storage or transport means through an unloading conveyor means, such as an auger, which operates on the bottom of the grain tank. Heretofore, the unloading auger has been gravity fed, necessitating a substantial downward slope in the order of 35° in the grain tank floor toward the unloading auger axis. The slanted floor has resulted in a decreased grain tank volume for any given vertical and horizontal dimensions, and conversely a higher tank has been required for any given horizontal dimensions to provide the desired tank volume.

The present invention reduces the height of the grain tank and consequently lowers the combine silhouette, by providing a grain tank which utilizes an unloading conveyor means fed by a plurality of transverse auxiliary conveyor means on the bottom of the tank. This arrangement avoids the necessity for a steeply sloping tank bottom, thus allowing a reduction in the height of the tank for any given tank volume.

Accordingly, an object of the present invention is to provide a combine with a lower silhouette by providing an improved grain tank. Another object is to provide improved unloading means for a grain tank. Another object is to provide a grain tank having unloading means on the bottom of the tank and having a maximum volume for any given horizontal and vertical dimensions. Still another object is to provide a storage tank having unloading conveyor means fed by auxiliary conveyors within the tank.

These and other objects and advantages of the invention will become apparent from a consideration of the following description and accompanying drawings wherein an embodiment of the invention is disclosed.

Figure 1:
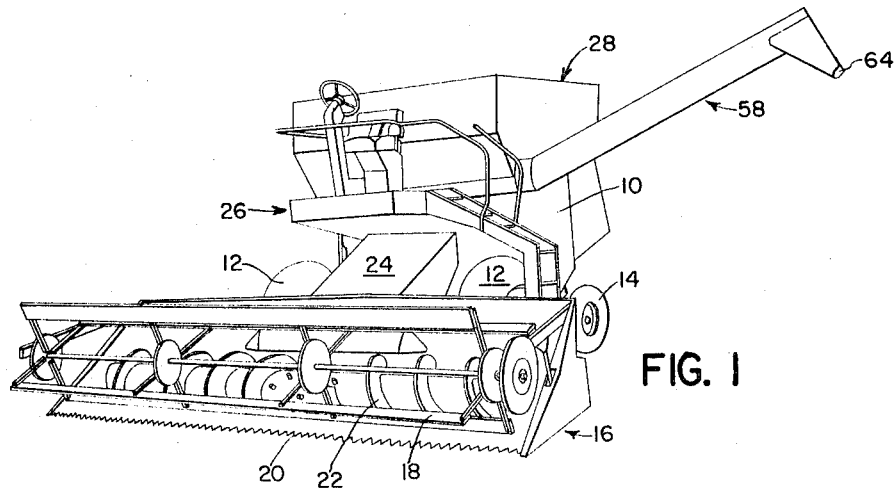
Figure 2:
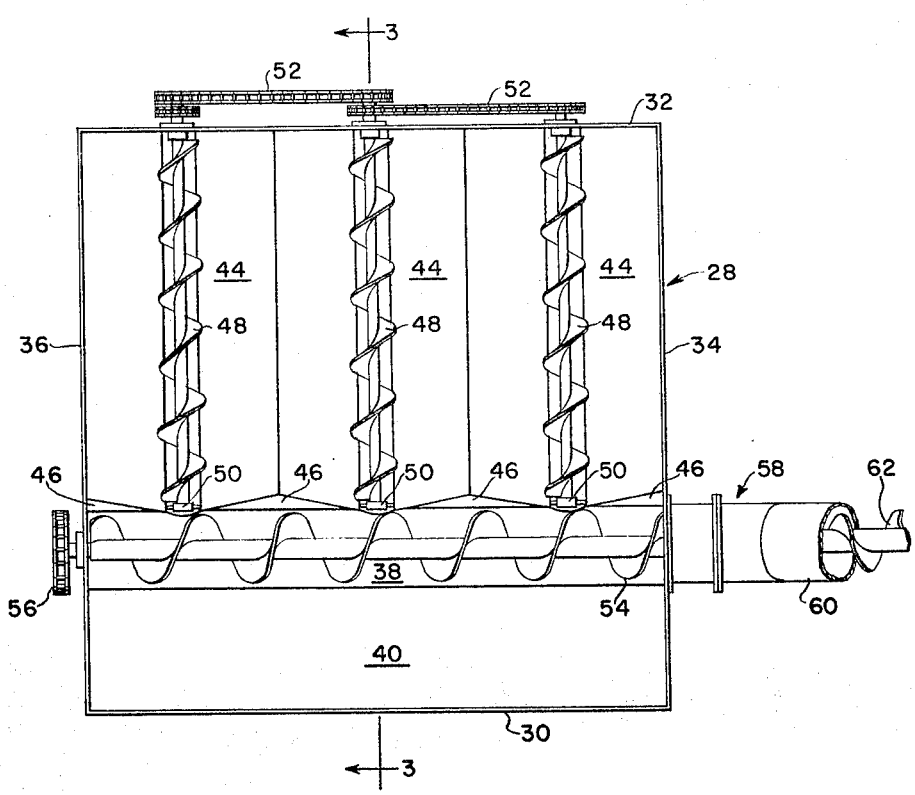
Figure 3:
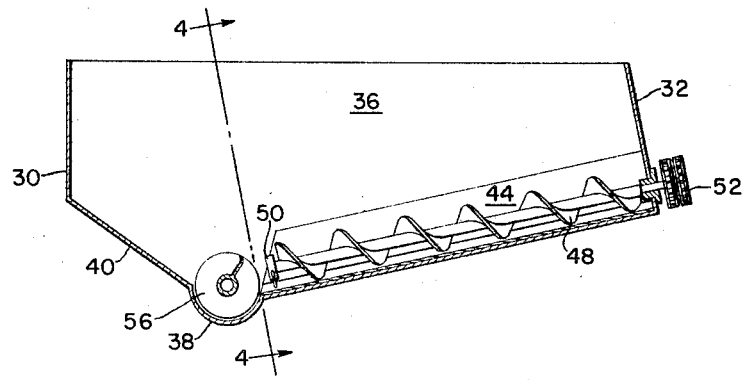
Figure 4:
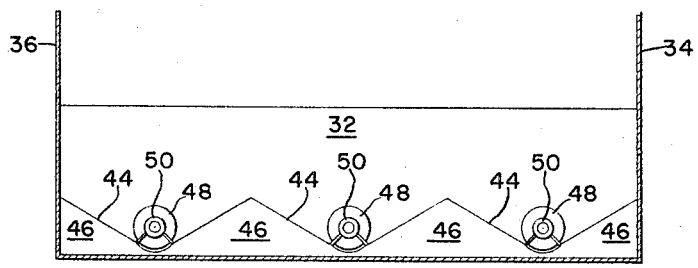

In the drawings:
FIG. 1 is a perspective view of a typical combine embodying the improved grain tank and unloading means.
FIG. 2 is a top view of the grain tank.
FIG. 3 is a sectional view of the grain tank as seen along line 3—3 of FIG. 2.
FIG. 4 is a sectional view of the grain tank as seen along line 4—4 of FIG. 3.

Referring now to the drawings, there is shown a combine including a main separator body 10 carried on front wheels 12 and rear wheels 14. A cutting platform 16 is mounted on the front of the body transverse to the direction of machine travel and carries a reel 18, a cutter bar 20 which cuts the grain, and an auger 22 which feeds the grain to a feeder house 24 between the cutting platform and the main separator body. The grain is fed through the feeder house to the threshing mechanism (not shown) within the body.

An operator's station 26 is located at the upper forward portion of the body. To the rear of this station, is a grain tank 28, mounted on top of the body. After the grain is threshed, the cleaned grain is conveyed to the grain tank by elevator means (not shown).

The grain tank is open at the top and has a front wall 30, a rear wall 32, and opposite side walls 34 and 36. The bottom of the tank is partly formed by a discharge trough 38, which extends horizontally between the lower edges of opposite side walls near the front wall. A front bottom portion 40 slopes downward from the front wall to the front edge of the discharge trough 38 at a relatively steep angle so that grain will slide down the front portion into the trough. A plurality of parallel, adjacent, auxiliary troughs 44, transverse to the discharge trough, and sloping slightly downward from the rear wall to the discharge trough, form a rear bottom portion between opposite side walls. The bottoms of the auxiliary troughs intersect the rear edge of the discharge trough, the vertical triangular areas between adjacent troughs and between the troughs and the side walls at the discharge end of the troughs being covered with triangular facings 46.

An auxiliary auger 48, journaled at one end in the rear wall 32 and at the other end in a support member 50 which extends from the discharge end of the auxiliary troughs, rotates in each auxiliary trough. The auxiliary augers are driven by a drive means 52 and convey the grain to the discharge trough.

A discharge auger 54, journaled at one end in the side wall 36, extends through an opening in the opposite side wall 34 at the end of discharge trough 38. The discharge auger is rotated in the discharge trough by drive means 56 and conveys the grain through the opening in the side wall 36 to an external unloading conveyor means 58, comprising a tube 60 within which is journaled an unloading auger 62 having one end connected to and rotated by the discharge auger, the tube having one end over the side wall opening and extending transversely from the side wall.

When the grain tank 28 is filled, or at any desired interval, the tank is emptied into an adjacent vehicle positioned below an outlet 64 in the external unloading conveyor means 58, by engaging drive means 52 and 56 which are disconnectibly powered by the combine drive. Drive means 52 rotates the auxiliary augers 48 which move the grain horizontally in their respective troughs to the discharge trough 38. The discharge auger 54, rotated by the drive means 56, then moves the grain along the discharge trough through the side opening to the external unloading conveyor 58, which discharges the grain through the outlet 64 into the adjacent vehicle.

The discharge trough and auger can intersect the sides at variable angles and at any distance from the front wall. However, it is desirable that they are positioned as far forward as possible, so that the front bottom portion 40 will be relatively small, since the necessary pitch of this bottom portion reduces the tank volume. The greater the relative length of the substantially horizontal auxiliary augers and troughs, the more nearly rectangular is the longitudinal vertical cross section of the grain tank, and consequently the less the height of the grain tank for a given tank volume.

Other features and advantages of the present invention will readily occur to those skilled in the art, as will many modifications and alterations in the preferred embodiment of the invention described herein, all of which may be achieved without departing from the spirit and scope of the invention.

What is claimed is:
1. A crop-handling apparatus for mounting on agricultural machinery comprising a crop receptacle including opposite side walls and a bottom, one of said walls having an opening at its bottom edge, discharge conveyor means on the bottom of said receptacle and extending between said opening and the opposite side wall for moving crops through said opening, and one or more auxiliary conveyor means on said bottom, the discharge end of each auxiliary conveyor means being proximate to and positively feeding said discharge conveyor means.

2. A crop receptacle for agricultural machinery comprising a bottom and opposite upright side walls rising from the bottom, their upper edges in the same horizontal plane, one of said side walls having an opening at its bottom edge near an adjacent wall, a one-way auger type discharge conveyor means on the bottom of said receptacle in communication with and approximately axially transverse to said opening and extending to the side wall opposite said opening substantially axially parallel to said adjacent wall, for moving crops through said opening, and a plurality of auxiliary conveyor means on said bottom extending transversely from said discharge conveyor to the side wall opposite said adjacent wall for positively feeding crops to said discharge conveyor means.

3. The invention claimed in claim 2 wherein the conveyor means are augers rotating in troughs which partly from the bottom of the receptacle.

4. In a combine, an improved grain tank carried by the combine comprising a bottom, opposite side walls, one of said walls having an opening at its bottom edge, a one-way auger type discharge conveyor means on said bottom approximately axially transverse to the opening for moving the grain through the opening, and auxiliary conveyor means on the bottom of the tank for feeding said discharge conveyor means.

5. In a combine, an improved grain tank carried by the combine comprising a bottom, opposite upright side walls rising from the bottom, their upper edges in the same horizontal plane, one of said walls having an opening at its bottom edge, a discharge trough partly forming the bottom of said tank and extending between said opening and the opposite wall, a discharge auger rotatably mounted in said trough for moving grain through said opening, means for driving said discharge auger, a plurality of auxiliary troughs partly forming said bottom between said discharge trough and one or more side walls, auxiliary augers rotatably mounted in said troughs for moving grain to said discharge trough, and means for driving auxiliary augers.

6. In a combine, an improved grain tank carried by the combine and comprising a bottom, opposite upright side walls rising from the bottom, their upper edges in the same horizontal plane, one of said walls having an opening at its bottom edge near an adjacent wall, a discharge trough partly forming the bottom of said tank and extending between said opening in the opposite wall parallel to said adjacent wall, the bottom substantially sloping downward from said adjacent wall to said trough, a discharge auger rotatably mounted along the length of said trough for moving grain through said opening, a plurality of parallel auxiliary troughs partly forming said bottom transversely extending from said discharge trough to the wall opposite said adjacent wall, each trough having an auger rotatably mounted therein along its length for moving grain to said discharge trough, and means for driving said augers.

7. In a combine, an improved grain tank carried by the combine and comprising a bottom, opposite front and rear walls and opposite side walls rising substantially vertically from the bottom, said bottom forming a discharge trough parallel to and in close proximity to the front wall, the bottom having a substantial slope from said front wall to the front edge of said trough, the bottom also forming a plurality of adjacent parallel auxiliary troughs extending transversely from the rear of said discharge trough to said rear wall, one of said side walls having an opening communicating with said discharge trough, an auger rotatably mounted in said discharge trough along its length for moving grain through said opening, an auxiliary auger rotatably mounted in each auxiliary trough along its length for moving grain to said discharge trough, and means for driving said augers.

References Cited by the Examiner

UNITED STATES PATENTS

| | | | |
|---|---|---|---|
| 2,633,255 | 3/1953 | Hoffstetter | 214—17 |
| 2,728,470 | 12/1955 | Peterson | 214—17 X |
| 2,790,563 | 4/1957 | McCarthy | 214—17 |
| 2,953,360 | 9/1960 | Kline | 214—519 X |
| 3,045,804 | 7/1962 | Peterson | 214—519 X |
| 3,108,703 | 10/1963 | Horne et al. | 214—17 X |
| 3,215,290 | 11/1965 | Wellons | 214—17 |

GERALD M. FORLENZA, *Primary Examiner.*

R. G. SHERIDAN, *Assistant Examiner.*